United States Patent [19]
Kang

[11] Patent Number: 5,548,337
[45] Date of Patent: Aug. 20, 1996

[54] VIDEO SIGNAL PROCESSING APPARATUS FOR A WIDE-ASPECT TELEVISION

[75] Inventor: Kwon-Hag Kang, Seoul, Rep. of Korea

[73] Assignee: Daewoo Electronics Co., Ltd., Rep. of Korea

[21] Appl. No.: 311,859

[22] Filed: Sep. 26, 1994

[30]     Foreign Application Priority Data

Sep. 27, 1993 [KR] Rep. of Korea ............. 93-19937

[51] Int. Cl.⁶ ............................................. H04N 7/01
[52] U.S. Cl. ...................... 348/445; 348/441; 348/556; 348/704
[58] Field of Search ................................ 348/426, 441, 348/445, 474, 554, 555, 556, 437, 438, 434, 704; H04N 7/07

[56]         References Cited

U.S. PATENT DOCUMENTS

| | | | |
|---|---|---|---|
| 4,551,754 | 11/1985 | Meise et al. | 358/180 |
| 4,574,300 | 3/1986 | Hulyer | 358/11 |
| 4,672,443 | 6/1987 | Dischert et al. | 358/140 |
| 4,953,025 | 8/1990 | Saitoh et al. | 348/445 |
| 5,045,939 | 9/1991 | Okayama et al. | 348/445 |
| 5,311,309 | 5/1994 | Ersoz et al. | 348/409 |
| 5,323,235 | 6/1994 | Tonomura et al. | 348/445 |
| 5,363,140 | 11/1994 | Isomoto et al. | 348/445 |

Primary Examiner—Safet Mejahic
Assistant Examiner—Glenton B. Burgess
Attorney, Agent, or Firm—Beveridge, DeGrandi, Weilacher & Young

[57]             ABSTRACT

A video signal processing apparatus has an A/D converter for converting a video signal to a first digitized video signal, a timing pulse generator for generating a plurality of timing pulses, a multiplexer for selecting an output signal, a serial video processor for storing the first digitized video signal and outputting a digitized video signal in accordance with the selected output signal of the multiplexer, and D/A converter for converting the digitized video signal to a video signal. A panoramic picture can be obtained so that a display cutting problem in a zoom display and a lack of realistic display in a wide-aspect display can be eliminated.

6 Claims, 4 Drawing Sheets

FIG. 2
PRIOR ART
(A)
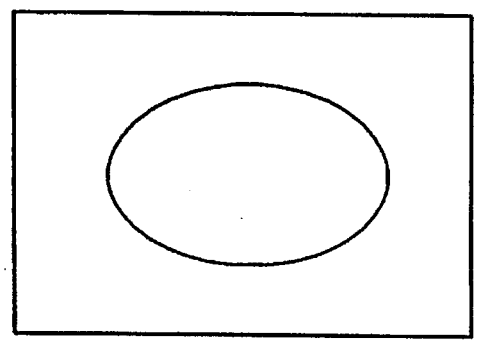
16:9 DISPLAY
(B)
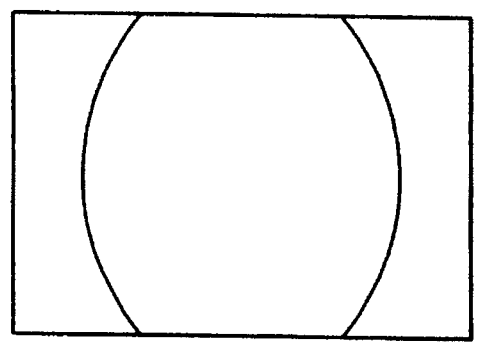
ZOOM DISPLAY
FIG. 3
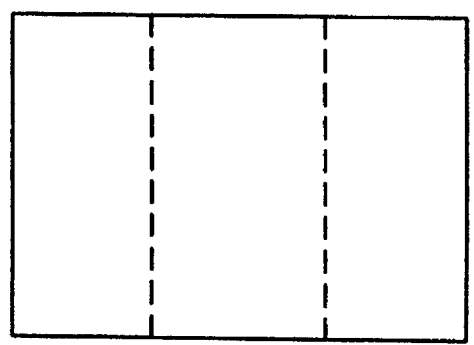
DISPLAY SECTION   16:9   5:4   16:9

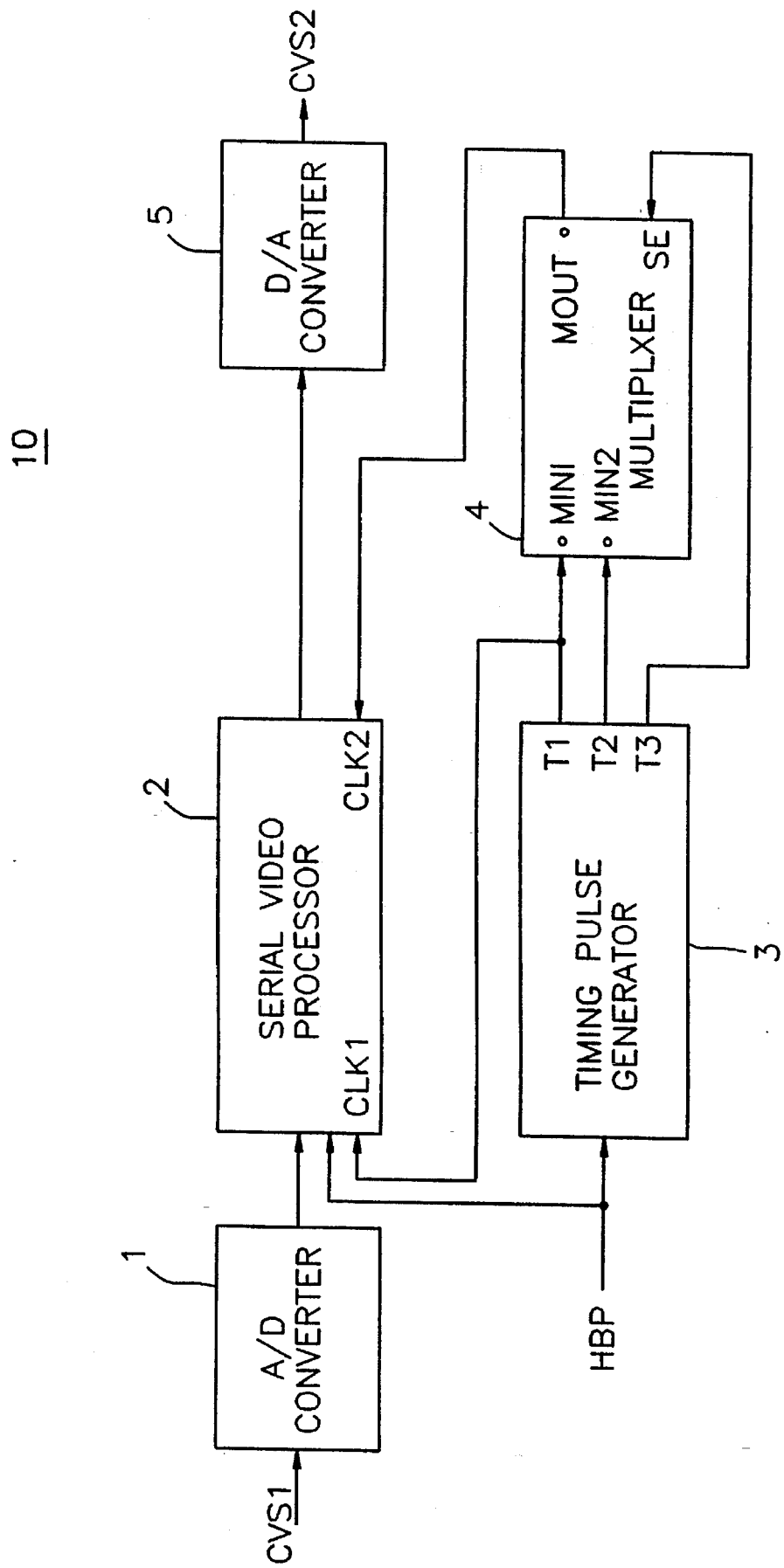

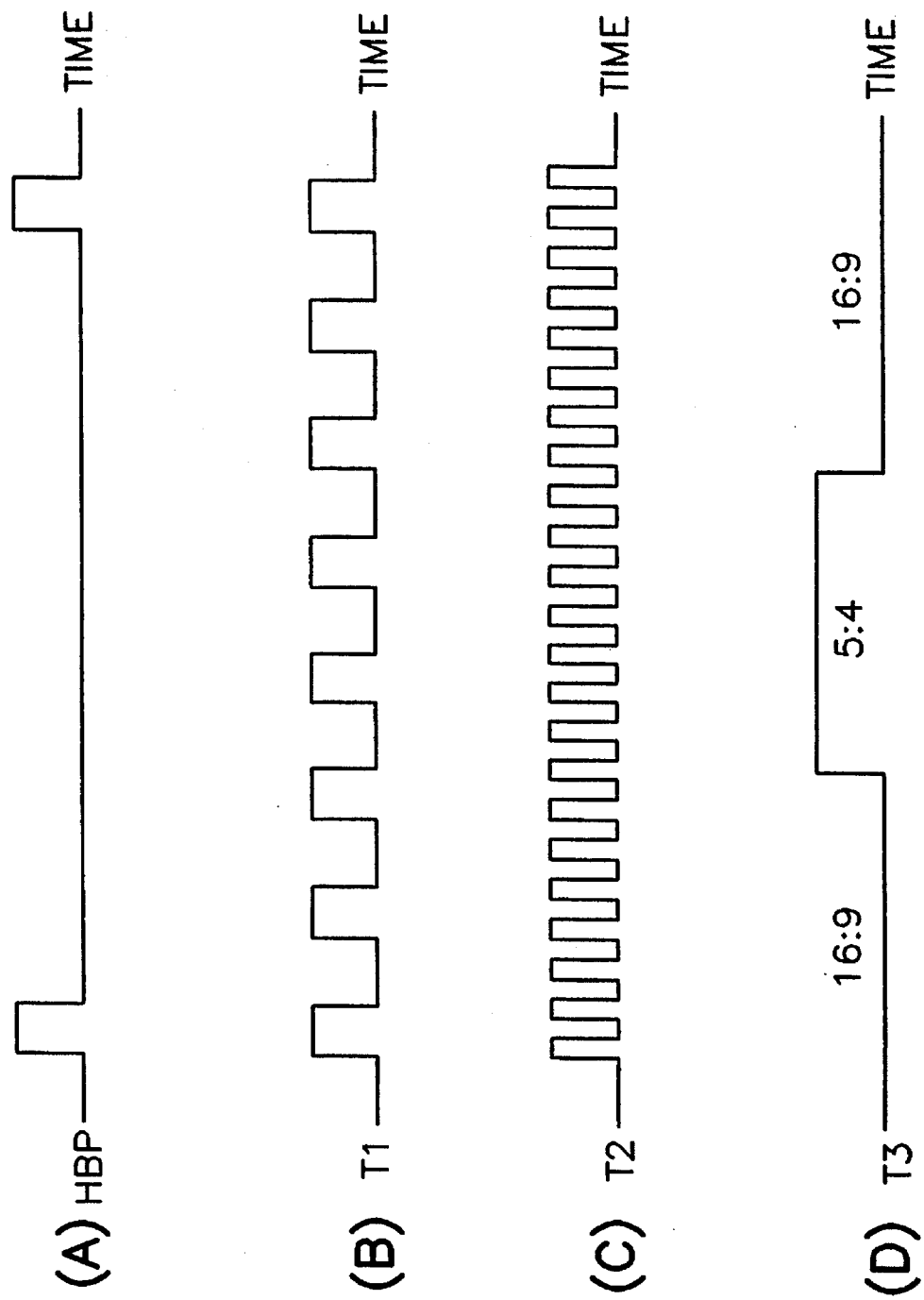

5,548,337

VIDEO SIGNAL PROCESSING APPARATUS FOR A WIDE-ASPECT TELEVISION

BACKGROUND OF THE INVENTION

1. Field of the Invention

The present invention relates to a field of television, more particularly to a video signal processing apparatus for a wide-aspect television.

2. Prior Arts

Recently, a television set is gradually getting larger in size and a display format ratio is gradually expanded from a 4:3 display format ratio to a wide-aspect display format ratio of 16:9 or to a zoom display ratio. However, since broadcasting stations are still transmitting a television signal corresponding to a 4:3 display as usual, such television signal should be converted to a signal for producing a wide-aspect display or a zoom display. In general, in a wide-aspect television set, "an expanded picture" or a "wide aspect picture" means a 16:9 picture produced from a video signal representative of 4:3 display format ratio, and "a compressed picture" means a picture smaller than a 16:9 picture but larger than a 4:3 picture, which are shown in (A) and (B) of FIG. 2. U.S. Pat. No. 5,311,309 granted to Nathaniel H. Ersoz, et al, discloses a video signal processing apparatus for a wide-aspect television for processing a composite video signal to produce a 16:9 display or a zoom display.

FIG. 1 is a schematic block diagram of a conventional video signal processing apparatus for a wide-aspect television shown in above U.S. Patent. The functions of the apparatus disclosed therein are determined by an interpolator 337 and a timing generator 320/339. In particular, as can be anticipated in the functions of interpolator 337, the apparatus disclosed in the above U.S. Patent, has a main function for switching a 4:3 display to a 16:9 display or vice versa in addition to PIP (picture in picture) display function.

In such apparatus, there exist drawbacks in that reality is deteriorated when a 16:9 display is produced using the signal representative of a 4:3 display and the picture is expanded horizontally as shown in (A) of FIG. 2. Further, the picture should be cut in order to maintain the reality when a zoom display is produced from a signal representative of a 4:3 display, as shown in (B) of FIG. 2.

SUMMARY OF THE INVENTION

It is an object of the present invention to provide a video signal processing apparatus for a wide-aspect television capable of preventing a reality deterioration and display cutting when generating a 16:9 display from a signal of a 4:3 display.

It is another object of the present invention to provide a video signal processing apparatus for generating a panoramic picture in a wide-aspect television having different display ratios therein in a wide-aspect television set.

In order to achieve the above objects, a video signal processing apparatus according to the present invention comprises:

an analog/digital (A/D) converter for converting to a first digitized composite video signal from a first composite video signal outputted from a video switching unit;

a timing pulse generator for generating a first, a second, and a third timing pulses;

a multiplexer for inputting the first, second, and third timing pulses and; for outputting the first or the second timing pulse according to an input of the third timing pulse;

a serial video processor for inputting the first digitized composite video signal from the A/D converter in accordance with the first timing pulse from the multiplexer and for outputting a second digitized composite video signal in accordance with an input of the first or the second timing pulse from the multiplexer; and a digital/analog (D/A) converter for converting the second composite video signal from the second digitized composite video signal outputted from the serial video processor.

Since realistic picture in a 5:4 display format ratio is maintained on a center portion of a screen and expanded picture in a 16:9 display format ratio is obtained on right and left portions of the screen, such a panoramic picture can get rid of a display cutting problem in a zoom display and a lack of realistic display in a 16:9 display.

BRIEF DESCRIPTION OF THE DRAWINGS

The above objects and other advantages of the present invention will become more apparent by describing in detail a preferred embodiment thereof with reference to the attached drawings in which:

FIG. 2 is a view showing exemplary wide-aspect displays produced from a wide-aspect television having a conventional video signal processing apparatus;

FIG. 3 is a view showing a wide-aspect display produced from a wide-aspect television having a video signal processing apparatus according to one embodiment of the present invention;

FIG. 4 is a schematic block diagram of a video signal processing apparatus for a wide-aspect television according to one embodiment of the present invention; and FIG. 5 is a view showing timing pulse waveforms employed in a video signal processing apparatus for a wide-aspect television according to one embodiment of the present invention.

DESCRIPTION OF THE PREFERRED EMBODIMENT

Figure 1:
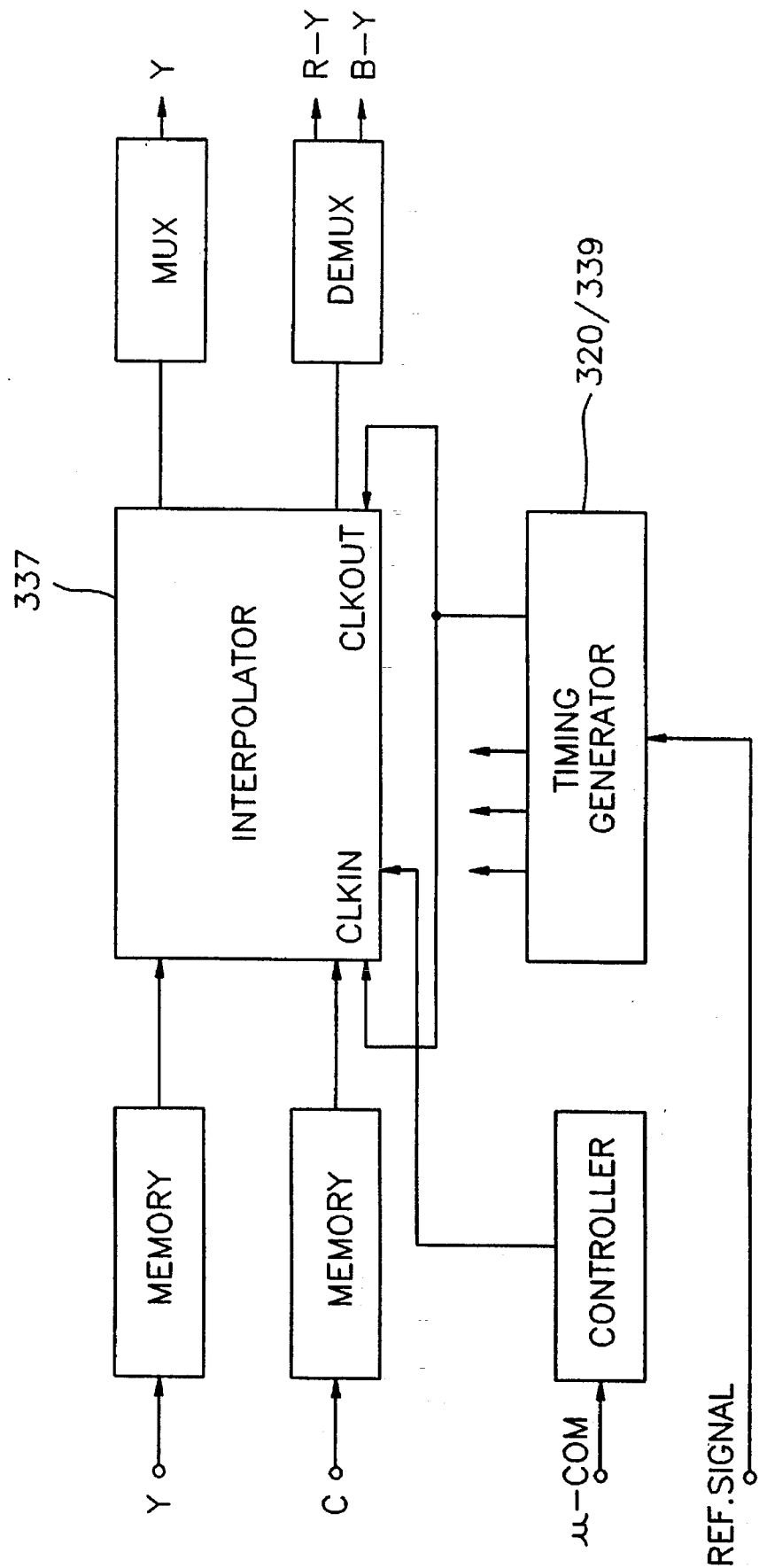
FIG. 1 is a schematic block diagram of a conventional video signal processing apparatus for a wide-aspect television.

The construction of a video signal processing apparatus for a wide-aspect television according to one embodiment of the present invention will be described hereunder in detail with reference to the accompanying drawings.

FIG. 3 is a view showing a wide-aspect display produced from a wide-aspect television having a video signal processing apparatus according to one embodiment of the present invention, FIG. 4 is a schematic block diagram of a video signal processing apparatus for a wide-aspect television according to one embodiment of the present invention, and FIG. 5 is a view showing timing pulse waveforms employed in a video signal processing apparatus for a wide-aspect television according to one embodiment of the present invention.

As shown in FIGS. 3 to 5, a video signal processing apparatus 10 for a wide-aspect television according to one embodiment of the present invention includes an analog/digital (A/D) converter 1 for converting a first composite video signal CVS1 generated from a video switching unit (not shown) into a first digitized composite video signal DCVS1; a timing pulse generator 3 for generating a first, a second and a third timing pulses T1, T2 and T3; a multiplexer 4 for outputting first timing pulse T1 or second timing pulse T2 in accordance with an input of a third timing pulse T3; a serial video processor 2 for inputting first digitized composite video signal DCVS1 from A/D converter 1 in accordance with first timing pulse T1 and for outputting a second digitized composite video signal DCVS2 in accordance with an input of first timing pulse T1 or second timing pulse T2; and a digital/analog (D/A converter 5 for converting to a second composite video signal CVS2 second digitized composite video signal DCVS2 outputted from serial video processor 2. Serial video processor 2 and timing pulse generator 3 are synchronized with each other by a horizontal blanking pulse HBP.

The operations of a video signal processing apparatus having the construction mentioned above will be described hereunder in detail.

Composite video signal CVS1, which is outputted from the video switching unit, is inputted to A/D converter 1. Composite video signal CVS1 is converted to digitized composite video signal DCVS1 at a sampling frequency of 28 MHz in A/D converter 1, and digitized composite video signal DCVS1 is inputted to serial video processor 2.

In the meantime, timing pulse generator 3 generates timing pulse T1 of 28 MHz, as shown in (B) of FIG. 5, which is inputted to an input terminal CLK1 of serial video processor 2 and to an input terminal MIN1 of multiplexer 4. Serial video processor 2 and timing pulse generator 3 are synchronized with each other by horizontal blanking pulse HBP as shown in (A) of FIG. 5. Therefore, digitized composite video signal DCVS1 is applied to serial video processor 2 in synchronization with timing pulse T1.

Further, timing pulse generator 3 generates timing pulse T2 of 35 MHz, as shown in (C) of FIG. 5 and timing pulse T3 as shown in (D) of FIG. 5, which are respectively applied to input terminals MIN2 and SE of mutliplexer 4. Timing pulse T3 enables multiplexer 4 to output one of timing pulses T1 and T2 through an output terminal MOUT thereof, which is applied to an input terminal CLK2 of serial video processor 2.

That is, timing pulse T3 is a select signal which selects timing pulse T1 or timing pulse T2 to be outputted from multiplexer 4.

One cycle of timing pulse T3 is comprised of a low level (a first level), a high level (a second level higher than the first level), and a low level (the first level), and a ratio of a high level duration with respect to a low level duration is 1:2 in one cycle thereof.

Here, timing pulse T1 is selected when a low level of timing pulse T3 is applied to multiplexer 4 and timing pulse T2 is selected when a high level of timing pulse T3 is applied to multiplexer 4.

When timing pulse T1 is applied to input terminal CLK2 of serial video processor 2 with a low level of timing pulse T3 applied to input terminal SE of multiplexer 4, digitized composite video signal DCVS1, which is transmitted to serial video processor 2 in synchronization with timing pulse T1, is outputted in an inputted format as digitized composite video signal DCVS2 from serial video processor 2.

In the meantime, when timing pulse T2 having a higher frequency than timing pulse T1 is applied to input terminal CLK2 of serial video processor 2 with a high level of timing pulse T3 applied to input terminal SE of multiplexer 4, digitized composite video signal DCVS1 is outputted faster than inputting thereof, that is, in a compressed format as digitized composite video signal DCVS2, from serial video processor 2.

Digitized composite video signal DCVS2 is applied to digital/analog (D/A) converter 5, and converted to an analog composite video signal CVS2 therethrough.

Composite video signal CVS2 outputted from D/A converter 5 is transmitted to an RGB matrix unit (not shown) to make expanded and compressed pictures on a screen.

That is, a wide-aspect display of 16:9 ratio is obtained on a screen from a composite video signal outputted in accordance with timing pulse T1 selected in a low level of timing pulse T3, and a compressed picture of 5:4 ratio is obtained on the screen from a compressed composite video signal outputted in accordance with timing pulse T2 selected in a high level of timing pulse T3. Accordingly, a panoramic picture on the screen can be accomplished as shown in FIG. 3.

Since realistic picture in a 5:4 display format ratio is maintained on a center portion of a screen and expanded picture in a 16:0 display format ratio is obtained on right and left portions of the screen, such a panoramic picture can get rid of a display cutting problem in a zoom display and a lack of realistic display in a 16:9 display.

Further, the present invention is not limited to the above embodiment and may be modified without departing from the scope thereof.

For example, from the above embodiment, the timing pulses T1 and T2 generated from the timing pulse generator are not limited to specific frequencies respectively, and a frequency of timing pulse T2 is selected higher than that of timing pulse T1 to make a certain ratio between the two.

Timing pulse T3 outputted from the timing pulse generator may be changed to have a different ratio between a low level and a high level durations in one cycle thereof, so that a different panoramic picture is obtained on a screen.

What is claimed is:

1. A video signal processing apparatus for a wide-aspect television for producing a wide-aspect display signal by processing a first composite video signal outputted from a video switching unit, said video signal processing apparatus comprising:

analog/digital (A/D) converter for converting to a first digitized composite video signal, said first composite video signal generated from said video switching unit;

a timing pulse generator for generating a first, a second and a third timing pulses, wherein a frequency of said second timing pulse is higher by a certain ratio with respect to a frequency of said first timing pulse;

a multiplexer for inputting said first, second, and third timing pulses and for outputting said first timing pulse or said second timing pulse in accordance with an input of said third timing pulse;

a serial video processor for inputting said first digitized composite video signal from said A/D converter in accordance with said first timing pulse from said multiplexer and for outputting a second digitized composite video signal in accordance with an input of said first timing pulse or said second timing pulse from said multiplexer; and a digital/analog (D/A) converter for converting to a second composite video signal, said second digitized composite video signal outputted from said serial video processor.

2. The video signal processing apparatus as claimed in claim 1, wherein said serial video processor and said timing pulse generator are synchronized with each other by a horizontal blanking pulse.

3. The video signal processing apparatus as claimed in claim 1, wherein a frequency of said second timing pulse is higher than that of said first timing pulse.

4. The video signal processing apparatus as claimed in claim 1, wherein one cycle of said third timing pulse is constructed with a low, a high and a low levels, and has a ratio of a high level duration with respect to a low level duration.

5. The video signal processing apparatus as claimed in claim 4, wherein said ratio of said high level duration with respect to said low level duration is 1:2.

6. The video signal processing apparatus as claimed in claim 3, wherein a ratio of said frequency of said second timing pulse with respect to that of said first timing pulse is 5:4.

* * * * *